United States Patent
Tsujimoto

(10) Patent No.: US 9,951,822 B2
(45) Date of Patent: Apr. 24, 2018

(54) CONSTANT-VELOCITY JOINT

(71) Applicant: HONDA MOTOR CO., LTD., Tokyo (JP)

(72) Inventor: Fumihiko Tsujimoto, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/844,073

(22) Filed: Sep. 3, 2015

(65) Prior Publication Data

US 2016/0084319 A1 Mar. 24, 2016

(30) Foreign Application Priority Data

Sep. 22, 2014 (JP) .................................. 2014-192362

(51) Int. Cl.
*F16D 3/205* (2006.01)

(52) U.S. Cl.
CPC ......... *F16D 3/2055* (2013.01); *Y10S 464/905* (2013.01)

(58) Field of Classification Search
CPC ........................... F16D 3/2055; Y10S 464/905
USPC .................................. 464/111, 123, 124, 905
See application file for complete search history.

(56) References Cited

U.S. PATENT DOCUMENTS

| 8,257,186 | B2* | 9/2012 | Ichikawa | .............. F16D 3/2055 464/111 |
| 9,394,949 | B2 | 7/2016 | Miao et al. | |
| 2010/0273561 | A1* | 10/2010 | Wakamatsu | .......... F16D 3/2055 464/111 |
| 2011/0053695 | A1* | 3/2011 | Yun | ....................... F16D 3/2055 |
| 2015/0219165 | A1* | 8/2015 | Tsujimoto | ............. F16D 3/2055 464/111 |

FOREIGN PATENT DOCUMENTS

| CN | 103958911 A | 7/2014 | |
| DE | 26 20 527 B1* | 1/1977 | ................... 464/111 |
| JP | 49-090747 U | 8/1974 | |

(Continued)

OTHER PUBLICATIONS

Japanese Office Action application No. 2014-192362 dated Jul. 19, 2016.

(Continued)

*Primary Examiner* — Gregory J Binda
(74) *Attorney, Agent, or Firm* — Squire Patton Boggs (US) LLP

(57) ABSTRACT

In a constant-velocity joint, an inner member thereof includes holders that serve to retain respective roller assemblies. When each of the holders is hypothetically divided into three equal parts made up of a proximal end portion, an intermediate portion, and a distal end portion from a side of an annular member, an inner wall surface of an inner roller of the roller assembly contacts only a side wall surface of the proximal end portion. The inner roller preferably has an inside diameter, which is minimum at a contact point that contacts the side wall surface of the proximal end portion. More specifically, the inside diameter of the inner roller gradually expands in diameter from the contact point to a side that faces toward the annular member, and further, gradually expands in diameter from the contact point to a side that faces toward the distal end portion.

6 Claims, 10 Drawing Sheets

(56) References Cited

FOREIGN PATENT DOCUMENTS

| | | |
|---|---|---|
| JP | 62-020225 U | 2/1987 |
| JP | 3984816 B2 | 10/2007 |
| JP | 2007-327617 A | 12/2007 |
| JP | 2010-014198 A | 1/2010 |

OTHER PUBLICATIONS

Japan Patent Office, Office Action corresponding to Japanese Patent Application No. 2014-192362, dated Mar. 21, 2017.
Chinese Patent Office, Office Action corresponding to Appln. No. 201510595214.2, dated Jul. 31, 2017.

* cited by examiner

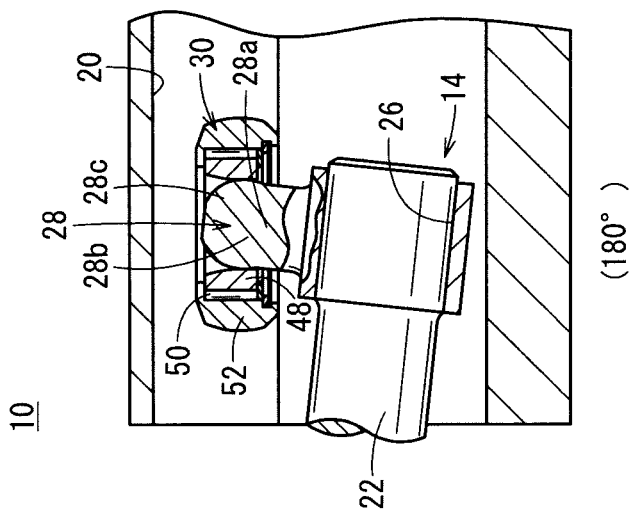
FIG. 9A (0°)
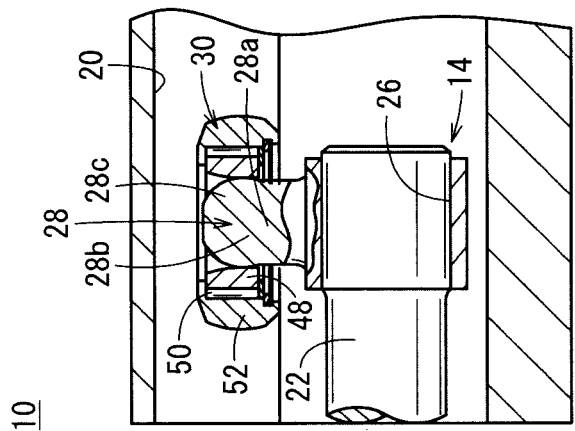
FIG. 9B (90°)
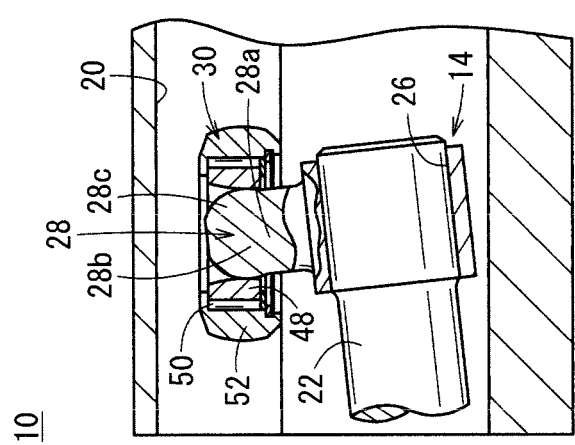
FIG. 9C (180°)

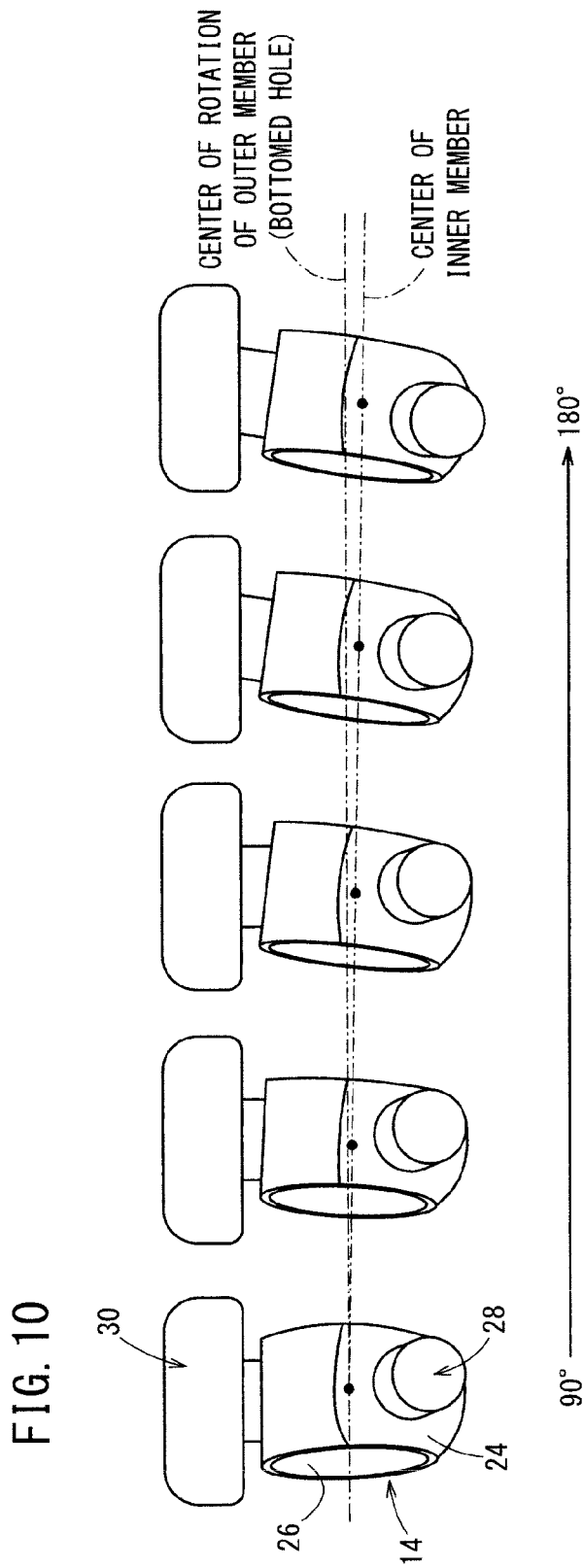

CONSTANT-VELOCITY JOINT

CROSS-REFERENCE TO RELATED APPLICATION

This application is based upon and claims the benefit of priority from Japanese Patent Application No. 2014-192362 filed on Sep. 22, 2014, the contents of which are incorporated herein by reference.

BACKGROUND OF THE INVENTION

Field of the Invention

The present invention relates to a constant-velocity joint, which is interposed between a first transmission shaft and a second transmission shaft, for transmitting rotary drive power from the first transmission shaft to the second transmission shaft.

Description of the Related Art

Automobiles are arranged such that rotary drive power, which is generated by an internal combustion engine, an electric motor, or the like, is transmitted to the tires by drive power transmission shafts such as drive shafts, etc. In this case, the automobile is driven when the tires are rotated by the transmitted rotary drive power.

A constant-velocity joint is interposed between the drive power transmission shafts. The constant-velocity joint interconnects the drive power transmission shafts, such that the drive power transmission shafts can rotate about respective axes thereof.

One known type of constant-velocity joint is a tripod constant-velocity joint. Such a tripod constant-velocity joint includes an outer member having a bottomed cup, and an inner member that is fitted to the distal end of a drive power transmission shaft. Rollers, which are held by holders of the inner member, slide while rotating within respective guide grooves defined in an inner wall surface of the bottomed cup. When the drive power transmission shaft is tilted at a prescribed working angle, the holders are tilted relative to the rollers within the guide grooves in response to the inner member being tilted within the outer member.

If the rollers are tilted in following relation to the inclination of the holders, slippage occurs between the wall surfaces of the guide grooves and the rollers, thus resulting in an increase in sliding resistance. To avoid this problem, a structure has been proposed in which the posture of the rollers with respect to the guide grooves is maintained even if the holders are tilted. For example, in Japanese Patent No. 3984816, a constant-velocity joint is disclosed, in which the inner wall surface of each roller (referred to as "a ring" in Japanese Patent No. 3984816) and the side wall surface of each holder are placed in contact on a region, whereas the inner wall surface of the roller and the side wall surface of the holder are spaced away from each other on another region whereby a clearance is formed at the other region. The contact location between the inner wall surfaces of the rollers and the side wall surfaces of the holders normally is set at the center in the widthwise direction of the rings. Further, the holders are capable of being tilted about the contact location.

SUMMARY OF THE INVENTION

Recently, there has been a demand to reduce the size and weight of automotive parts. Since by satisfying such a demand, the energy required for driving the automobile is reduced, fuel consumption and the like can also be reduced.

From this standpoint, the concept of reducing the size and weight of a constant-velocity joint is called to mind. However, if the structure described in Japanese Patent No. 3984816 were to be reduced in size, the clearance formed between the holders and the rollers would also become smaller. For this reason, it is to be expected that it would become difficult for the holders to be tilted.

A major object of the present invention is to provide a constant-velocity joint in which a sufficient clearance is formed between the holders and the rollers.

Another object of the present invention is to provide a constant-velocity joint in which tilting of the holders can easily be performed.

According to an embodiment of the present invention, a constant-velocity joint is provided, which is interposed between a first transmission shaft and a second transmission shaft, and transmits rotary drive power from the first transmission shaft to the second transmission shaft. The constant-velocity joint includes an outer member coupled to the first transmission shaft, the outer member having a plurality of guide grooves defined in a side wall surface of the outer member, the guide grooves being spaced at prescribed intervals from each other and extending in an axial direction of the outer member, an inner member having an annular member and a plurality of holders, which project from the annular member respectively into the guide grooves, the annular member having an insertion hole, the second transmission shaft being inserted through the insertion hole, the inner member being inserted into the outer member, and a plurality of roller assemblies mounted respectively on the holders, and which rotate inside of the guide grooves. Each of the roller assemblies includes an inner roller, and an outer roller, which is mounted externally of the inner roller through rolling members. Further, in a case where each of the holders is divided into three equal parts made up of a proximal end portion, an intermediate portion, and a distal end portion, from a side in proximity to the annular member toward a side distanced from the annular member, an inner wall surface of the inner roller contacts only a side wall surface of the proximal end portion.

More specifically, with the constant-velocity joint according to the present invention, when the holder of the inner member that constitutes the constant-velocity joint is imaginarily divided into the three equal parts made up of the proximal end portion, the intermediate portion, and the distal end portion from the side in proximity to the annular member, the inner wall surface of the inner roller contacts only the side wall surface of the proximal end portion that is near to the annular member. On the other hand, the inner wall surface of the inner roller is not in contact with the side wall surface of the holder at the intermediate portion and the distal end portion on a more distal end side from the contact point (i.e., on the side remote from the annular member). Therefore, a comparatively large clearance is formed between the side wall surface of the holder and the inner wall surface of the inner roller.

Accordingly, even if the constant-velocity joint is reduced in size, a sufficient clearance can be assured between the inner wall surface of the inner roller and side wall surfaces of the intermediate portion and the distal end portion. Therefore, even with a small sized constant-velocity joint, when the inner member is subjected to tilting along with predetermined operating angles of the second transmission shaft, the holders can easily undergo tilting at the interiors of the inner rollers. As a result, the inner member can easily be tilted in following relation to the operating angle of the transmission shaft.

Further, so that the inner wall surface of the inner roller only contacts the side wall surface of the proximal end portion, the inside diameter of the inner roller is minimum at a contact point that contacts the side wall surface of the proximal end portion. More specifically, the wall thickness of the inner roller is large on the side of the proximal end portion and small on the side of the distal end portion. Therefore, the center of gravity of the inner roller is biased toward the annular member, resulting in a so-called low center of gravity. Consequently, circumferential oscillations of the roller assembly are minimized. As a result, frictional resistance is reduced, which enables a reduction in thrust resistance.

Further, in a case where the proximal end portion is imaginarily divided into two equal parts from a side in proximity to the annular member toward a side distanced from the annular member, the inner wall surface of the inner roller, for example, contacts a middle location of the side wall surface of the proximal end portion. In this case, the inner roller can have a sufficiently low center of gravity.

An inside diameter of the inner roller gradually expands in diameter from a contact site with the side wall surface of the proximal end portion to a side that faces toward the distal end portion. In this case, the inside diameter of the inner roller preferably also gradually expands in diameter from the contact site with the side wall surface of the proximal end portion to a side that faces toward the annular member. More specifically, the inner wall surface of the inner roller preferably is formed in an arcuate shape with the contact site thereof bulging outwardly.

In this case, the inner wall surface of the inner roller is in point contact with respect to the side wall surface of the holder. Consequently, the contact area is small. Therefore, the holder is adapted to be tilted more easily.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 9A to 9C are fragmentary sectional side elevational views showing a tilted posture of the inner member at phases of 0°, 90°, and 180°; and FIG. 10 is a flow diagram showing changes in the tilted posture of the inner member from a phase of 90° to a phase of 180°.

DESCRIPTION OF THE PREFERRED EMBODIMENTS

A constant-velocity joint according to a preferred embodiment of the present invention will be described in detail below with reference to the accompanying drawings.

Figure 1:
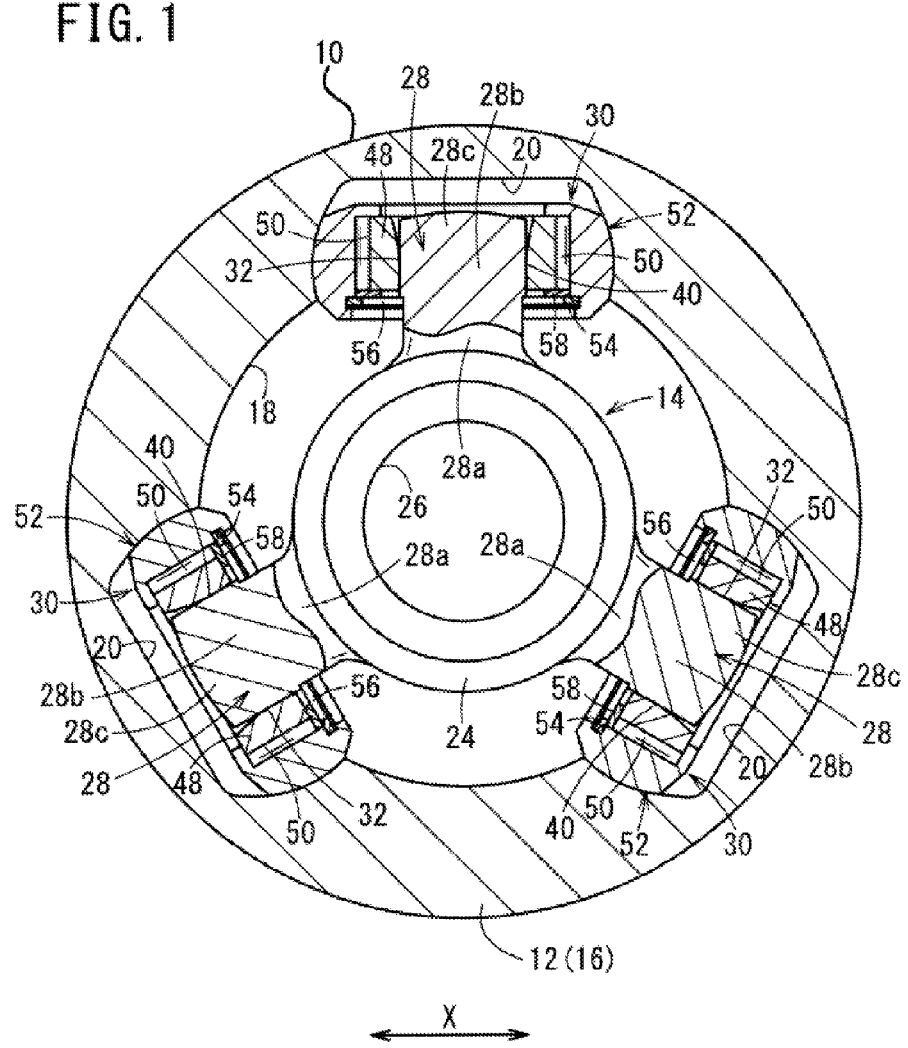
FIG. 1 is a transverse cross-sectional view of a constant-velocity joint according to an embodiment of the present invention, the view being taken along a line perpendicular to an axial direction of the constant-velocity joint.
Figure 2:
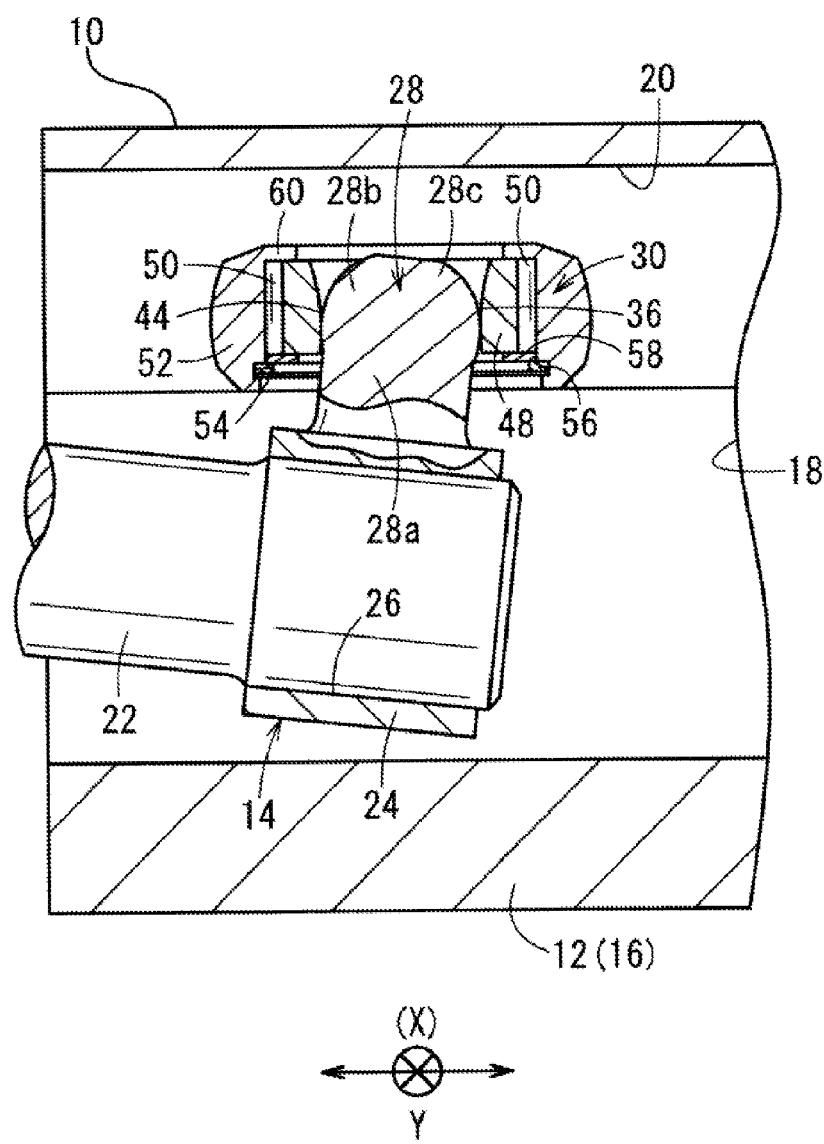
FIG. 2 is a fragmentary sectional side elevational view of the constant-velocity joint along the axial direction thereof.

FIG. 1 shows in transverse cross section a constant-velocity joint 10 according to an embodiment of the present invention, the view being taken along a line perpendicular to an axial direction of the constant-velocity joint. FIG. 2 shows in fragmentary sectional side elevation the constant-velocity joint along the axial direction thereof. In FIG. 1, the arrow X represents a widthwise or transverse direction of an outer member 12. In FIG. 2, the arrow Y represents a longitudinal direction of the constant-velocity joint 10. The X direction and the Y direction are perpendicular to each other.

The constant-velocity joint 10 comprises an outer member 12 and an inner member 14. The outer member 12 has a bottomed cup 16, and a non-illustrated shaft that protrudes from the outer surface of a bottom of the bottomed cup 16. A first transmission shaft, not shown, such as the rotational shaft of a transmission, for example, is coupled to the shaft of the outer member 12. On the other hand, the bottomed cup 16 has a bottomed hole 18 defined therein, which extends along the Y direction shown in FIG. 2, i.e., along the longitudinal direction of the constant-velocity joint 10. The bottomed hole 18 includes three guide grooves 20 (see FIG. 1) defined in an inner circumferential side wall surface thereof. The guide grooves 20 are spaced mutually at prescribed intervals and extend in the axial direction of the outer member 12.

As shown in FIG. 2, the inner member 14 is fitted over the distal end of a second transmission shaft 22, e.g., a drive shaft, and is inserted into the bottomed hole 18. More specifically, the inner member 14 comprises an annular member 24 with a hole 26 defined therein as an insertion hole, and with the second transmission shaft 22 being press-fitted into the insertion hole 26. The insertion hole 26 is defined by an inner wall surface of the annular member 24, which has non-illustrated teeth formed thereon. The second transmission shaft 22 has a side wall surface, which also has non-illustrated teeth formed thereon. The teeth on the inner wall surface of the annular member 24 and the teeth on the side wall surface of the second transmission shaft 22 are held in meshing engagement with each other.

The inner member 14 also includes three trunnions (see FIG. 1), which are joined to the annular member 24 and serve as holders that project respectively into the three guide grooves 20. Roller assemblies 30 are mounted rotatably on the trunnions 28, respectively.

Figure 3:
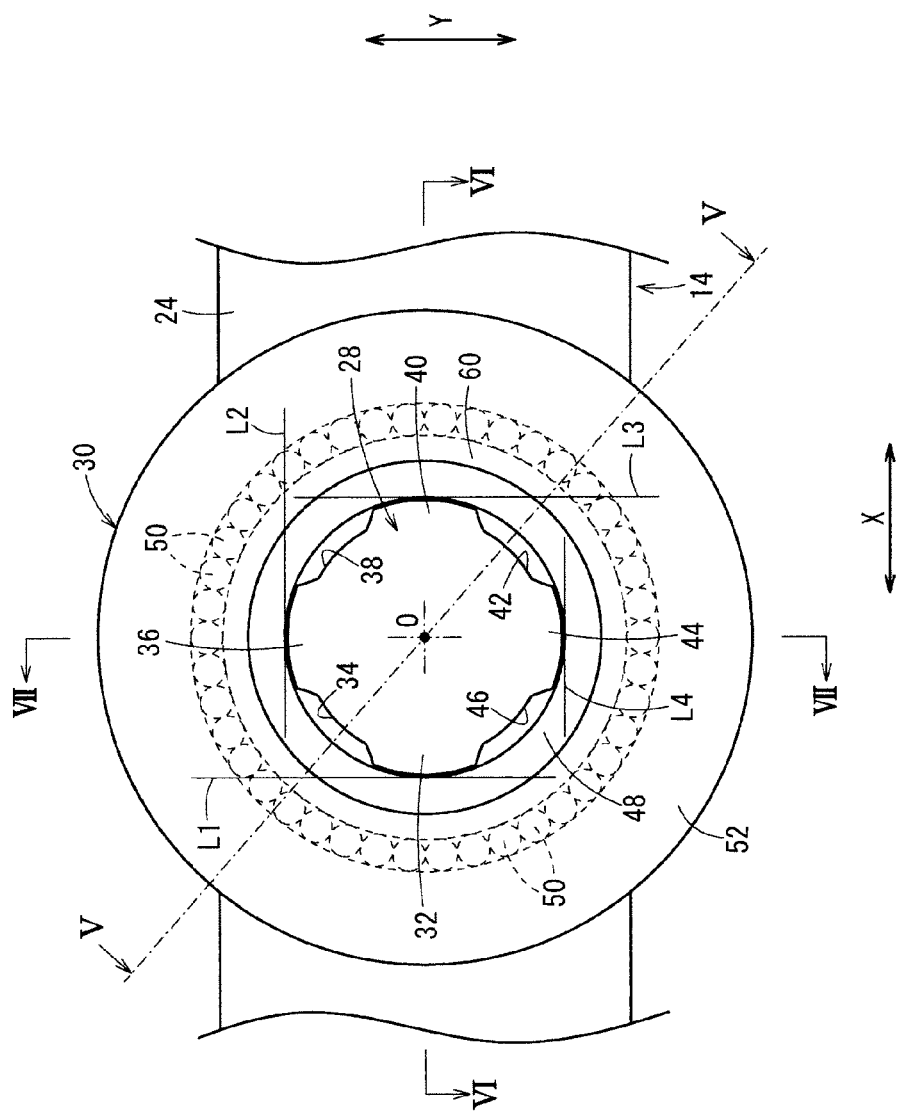
FIG. 3 is a plan view of a trunnion with a roller assembly mounted thereon.
Figure 4:
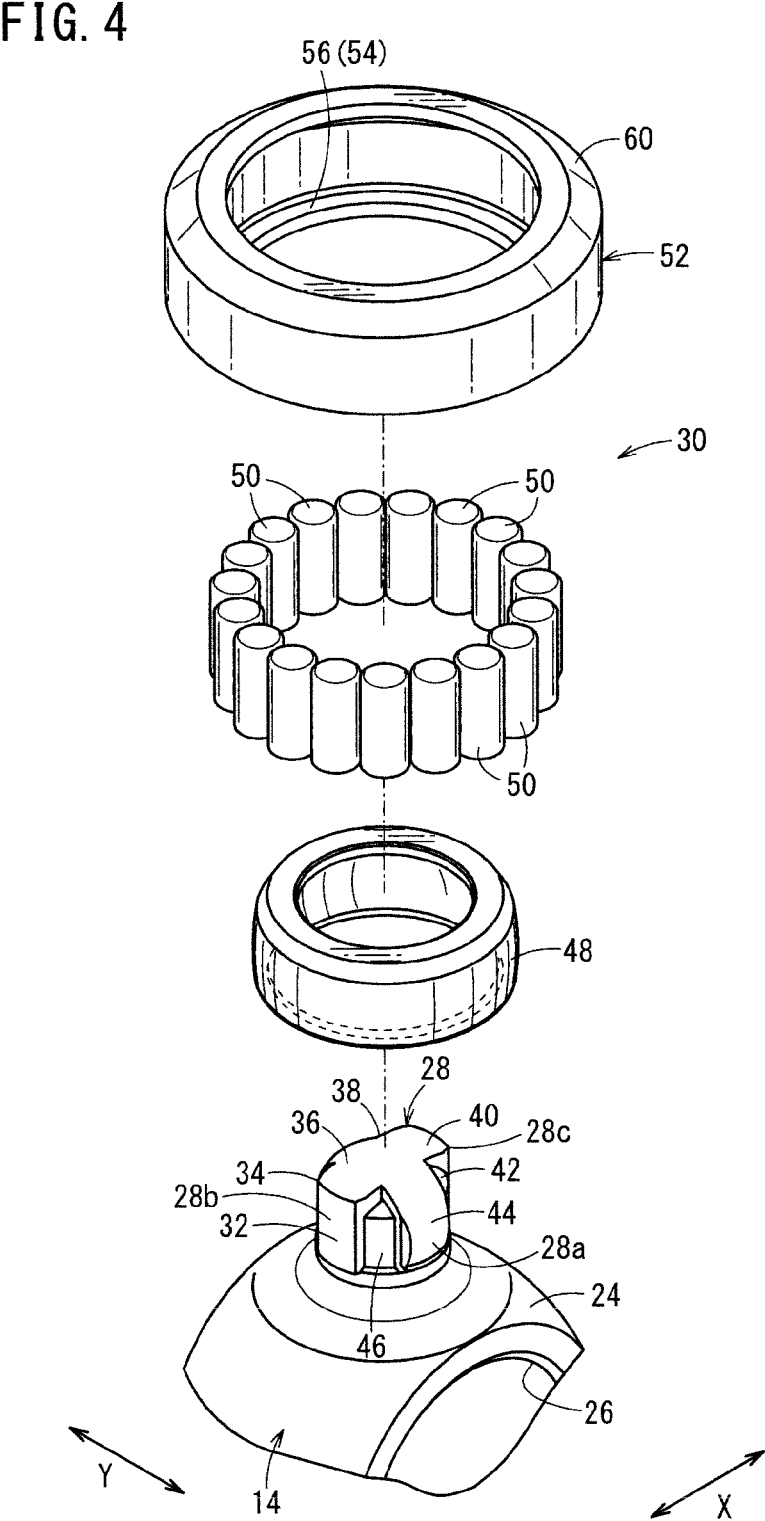
FIG. 4 is an exploded perspective view of the roller assembly and the trunnion in a disassembled state.

FIG. 3 shows in plan one of the trunnions 28 on which a roller assembly 30 is rotatably mounted. FIG. 4 shows in exploded perspective the trunnion 28 and the roller assembly 30 in a disassembled state. The X and Y directions shown in FIGS. 3 and 4 correspond respectively with the X and Y directions shown in FIG. 1 and FIG. 2.

The shape of the trunnion 28 will be described in detail below. The trunnion 28 includes a first lobe 32, a first recess 34, a second lobe 36, a second recess 38, a third lobe 40, a third recess 42, a fourth lobe 44, and a fourth recess 46, which are arranged in succession. More specifically, the lobes and the recesses are arranged alternately. The trunnion 28 has an outer side wall surface with an undulating shape in a radial direction thereof, such that the trunnion 28 is of a substantially crisscross shape as viewed in plan (see FIG. 3).

Only the curved side surfaces of the first lobe 32, the second lobe 36, the third lobe 40, and the fourth lobe 44 of the trunnion 28 come into abutment against the inner wall surface of the inner roller 48 of the roller assembly 30. On the other hand, the surfaces of the trunnion 28 that define the first recess 34, the second recess 38, the third recess 42, and the fourth recess 46 are spaced from the inner wall surface of the inner roller 48. More specifically, the first lobe 32, the second lobe 36, the third lobe 40, and the fourth lobe 44 serve as contact regions, which abut against the inner wall surface of the inner roller 48, whereas the first recess 34, the second recess 38, the third recess 42, and the fourth recess 46 serve as non-contact regions, which are distanced from, i.e., held out of abutment with, the inner wall surface of the inner roller 48.

As shown in FIG. 3, hypothetical tangential lines L1, L2, L3, L4 are drawn tangentially to the first lobe 32, the second lobe 36, the third lobe 40, and the fourth lobe 44. The hypothetical tangential line L1 to the first lobe and the hypothetical tangential line L3 to the third lobe 40 extend parallel to the Y direction, whereas the hypothetical tangential line L2 to the second lobe 36 and the hypothetical tangential line L4 to the fourth lobe 44 extend parallel to the X direction. Since the X direction is perpendicular to the Y direction, the hypothetical tangential lines L2, L4 are perpendicular to the Y direction.

As understood from the above, the first lobe 32 and the third lobe 40 serve as parallel regions where the hypothetical tangential lines L1, L3 extend parallel to the longitudinal direction (axial direction) of the guide groove 20. On the other hand, the second lobe 36 and the fourth lobe 44 serve as perpendicular regions where the hypothetical tangential lines L2, L4 extend perpendicularly to the longitudinal direction of the guide groove 20. As a result, in the trunnion 28, the first lobe 32 and the third lobe 40, which serve as parallel regions, and the second lobe 36 and the fourth lobe 44, which serve as perpendicular regions, come into abutment against the inner wall surface of the inner roller 48.

Figure 5:
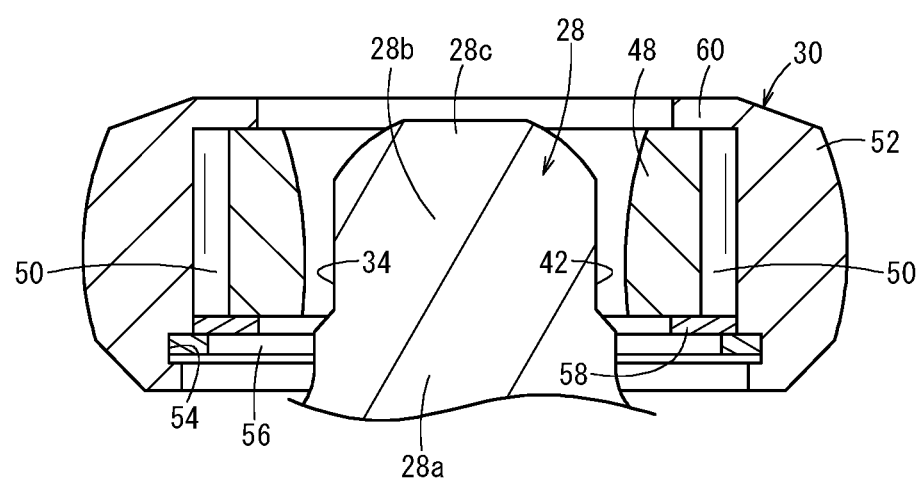
FIG. 5 is a cross-sectional view taken along line V-V of FIG. 3.
Figure 6:
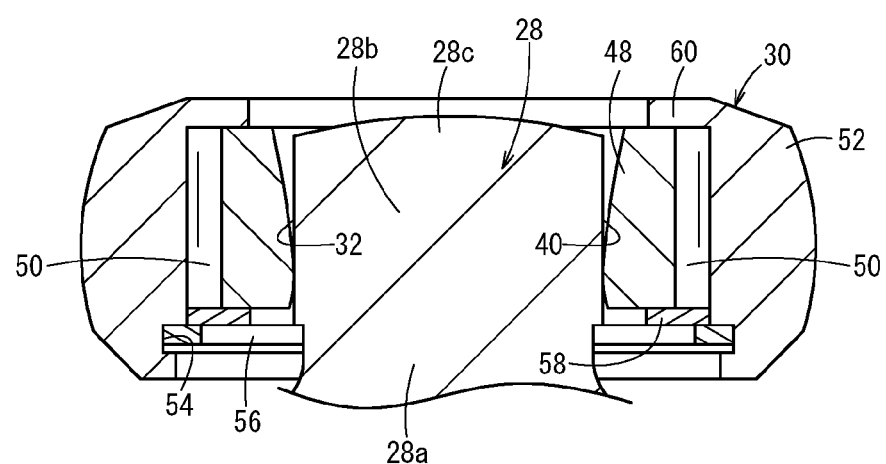
FIG. 6 is a cross-sectional view taken along line VI-VI of FIG. 3.
Figure 7:
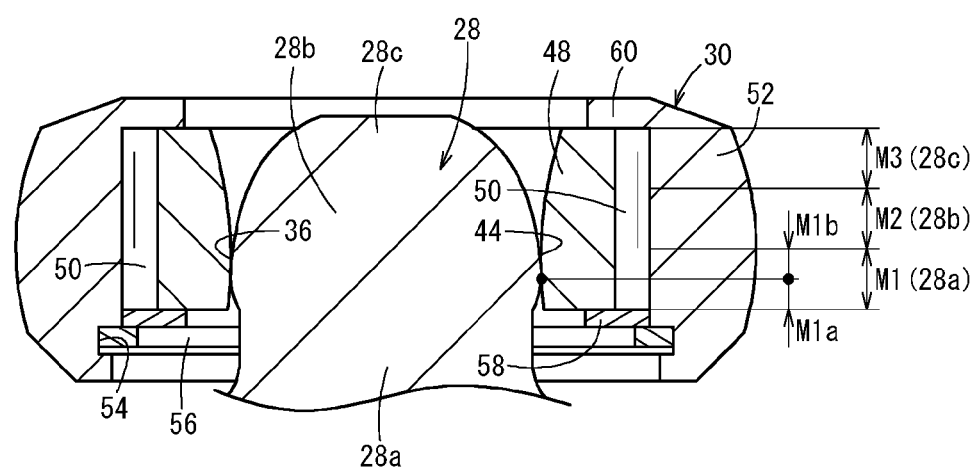
FIG. 7 is a cross-sectional view taken along line VII-VII of FIG. 3.

FIGS. 5, 6, and 7 are cross-sectional views taken along line V-V, line VI-VI, and line VII-VII, respectively, of FIG. 3. As shown in FIG. 3, all of the lines V-V, VI-VI, and VII-VII pass through a central point O on the upper end face of the trunnion 28. Further, as can be seen from FIG. 5, the first recess 34 and the third recess 42, which serve as non-contact regions, are distanced from the inner wall surface of the inner roller 48.

As shown in FIG. 7, the trunnion 28 can be divided hypothetically into three parts from a side in proximity to the annular member 24 toward a side distanced therefrom, or stated otherwise, in the direction of extension of the trunnion 28. More specifically, the height dimensions M1, M2, M3 in FIG. 7 are mutually equal to each other. Hereinbelow, the respective three-way divided regions of the trunnion 28 are referred to as a proximal end portion, an intermediate portion, and a distal end portion in order from the side closest to the annular member 24, and are indicated by the reference numerals 28a, 28b, 28c, respectively.

As shown in FIG. 6, the first lobe 32 and the third lobe 40 are of a substantially constant diameter from the proximal end portion 28a to the distal end portion 28c. Therefore, in a cross-sectional view taken along line VI-VI across the first lobe 32, the central point O, and the third lobe 40, the side wall surfaces of the trunnions 28 are straight line or linear in shape.

In contrast thereto, as shown in FIG. 7, the second lobe 36 and the fourth lobe 44 are maximum in diameter at a middle portion in the heightwise direction (in the direction of extension) of the proximal end portion 28a. From such a maximum diameter part to the lower end of the proximal end portion 28a, the second lobe 36 and the fourth lobe 44 are gradually reduced in diameter in an arcuate shape having a large radius of curvature. Further, from the large diameter part to the distal end portion 28c, the second lobe 36 and the fourth lobe 44 are reduced in diameter in an arcuate shape having a small radius of curvature.

The roller assembly 30 includes the inner roller 48, and a cylindrical outer roller 52 that is fitted over the inner roller 48 through a plurality of needle bearings (rolling members) 50. As shown in FIGS. 4 through 7, the inside diameter of the inner roller 48 is not constant, but rather changes such that, as viewed in cross section, the inner wall surface is arcuately shaped. More specifically, the inside diameter is small on the side of the proximal end portion 28a and large on the side of the distal end portion 28c. Accordingly, as shown in FIG. 7, the inner wall surface of the inner roller 48 bulges diametrically inward as it approaches the annular member 24, and therefore, the inner wall surface only contacts the side wall surfaces of the respective proximal end portions 28a of the first lobe 32, the second lobe 36, the third lobe 40, and the fourth lobe 44. Stated otherwise, the inner wall surface of the inner roller 48 does not come into contact with the intermediate portion 28b and the distal end portion 28c.

In the present embodiment, the inner wall surface of the inner roller 48 contacts a location midway in the heightwise direction (a middle location in the direction of extension) of the respective proximal end portions 28a of the first lobe 32, the second lobe 36, the third lobe 40, and the fourth lobe 44. More specifically, as shown in FIG. 7, taking the contact site between the inner wall surface and the proximal end portion 28a as a boundary, and assuming that the proximal end portion 28a is divided into two heights M1a and M1b, the heights M1a and M1b are equal (i.e., the equation M1=2M1a=2M1b is satisfied).

The inside diameter of the inner roller 48 is minimal at the contact site with the proximal end portion 28a. More specifically, the inside diameter of the inner roller 48 gradually expands in diameter from the contact site to a side that faces toward the annular member 24, and further, gradually expands in diameter from the contact site to a side that faces toward the distal end portion 28c.

Moreover, the inside diameter of the inner roller 48 is slightly larger compared with the outside diameter of the trunnion 28. Therefore, in actual practice, the location of contact between the inner wall surface of the inner roller 48 and the side wall surface of the trunnion 28 takes place at either the two locations of the first lobe and the second lobe 36, or the two locations of the third lobe 40 and the fourth lobe 44.

An annular groove 54 is formed on the inner wall surface of the outer roller 52. By fitting a circlip 56 into the annular groove 54, a retaining ring 58 is positioned and fixed in the interior of the outer roller 52. By way of the retaining ring 58 and a flange 60 that is formed on the outer roller 52, the plural needle bearings 50 are retained while being capable of rolling within the outer roller 52.

The constant-velocity joint 10 according to the present embodiment is constructed basically as described above. Next, effects and advantages of the constant-velocity joint 10 will be described.

When the first transmission shaft is energized to rotate, the rotary driving force (rotary drive power) thereof is transmitted to the inner member 14 through the trunnions 28, which are in engagement with the guide grooves 20 of the outer member 12. The rotary driving force is further transmitted to the second transmission shaft 22 which the inner member 14 is fitted over externally, so that ultimately, the second transmission shaft 22 is rotated in the same direction as the first transmission shaft.

When the second transmission shaft 22 is tilted through a predetermined working angle, since the roller assembly 30 is constrained within the guide grooves 20, as shown in FIG. 2, only the inner member 14 is placed in a tilted posture in response to the inclination of the second transmission shaft 22. Naturally, in association therewith, the trunnions 28 also undergo tilting in the interior of the inner rollers 48.

Figure 8:
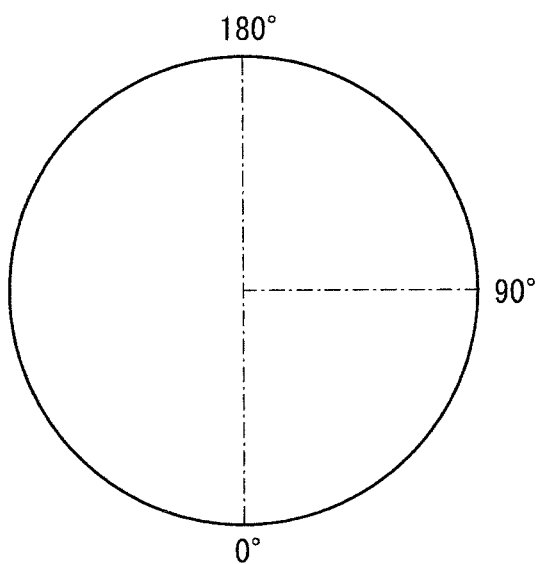
FIG. 8 is a schematic view for describing phases of a transmission shaft with respect to a bottomed hole that is formed in an outer member making up the constant-velocity joint.

More specifically, when the second transmission shaft 22 is tilted through a predetermined working angle while being rotated, the inner member 14 also is rotated at a tilted posture. As shown in FIG. 8, when the tilted second transmission shaft 22 is rotated in a counter-clockwise direction, the inner member 14 is placed in the postures shown in FIGS. 9A through 9C when reaching a bottommost orientation (phase 0°), a rightmost orientation (phase 90°), and an uppermost orientation (phase 180°), respectively.

FIG. 10 is a flow diagram showing changes in the tilted posture of the inner member 14 from a phase of 90° to a phase of 180°. As can be understood from FIG. 10, the center of the inner member 14 (center of the insertion hole 26) moves up and down accompanying rotation. Stated otherwise, the inner member 14 undergoes eccentric movement. Due to such eccentric movement, the trunnions 28 repeatedly approach toward and move away from the inner wall surfaces of the inner rollers 48 (see FIGS. 9A through 9C).

In this situation, with the constant-velocity joint 10 according to the present embodiment, the inner wall surface of the inner roller 48 contacts only the side wall surfaces of respective proximal end portions 28a of the first lobe 32 and the second lobe 36, or alternatively, contacts only the side wall surfaces of respective proximal end portions 28a of the third lobe 40 and the fourth lobe 44. The trunnions 28 undergo tilting about such contact points. As noted above, since the inside diameter of the inner roller 48 is minimal at the contact points, when the trunnion 28 is tilted, the intermediate portion 28b and the distal end portion 28c thereof do not interfere with the inner wall surface of the inner roller 48.

Consequently, in this case, even if the constant-velocity joint 10 is reduced in size and made compact, a sufficient clearance is formed between the inner wall surface of the inner roller 48, and the intermediate portion 28b and the distal end portion 28c of the trunnion 28. Therefore, any hindrance to tilting of the trunnion 28 inside the inner roller 48 is prevented.

As noted above, by the contact location of the inner roller 48 being only the side wall surface of the proximal end portion 28a of the trunnion 28, even when the tilt angle of the trunnion 28 becomes large, a large clearance can be formed between the intermediate portion 28b and the distal end portion 28c of the trunnion 28, and the inner wall surface of the inner roller 48. Consequently, even in the case that the constant-velocity joint 10 is reduced in size, a sufficient clearance can be assured between both members, i.e., the trunnion 28 and the inner roller 48. Therefore, the trunnion 28 can easily undergo tilting in the inner roller 48.

Moreover, the inside diameter of the inner roller 48 is minimal at the proximal end portion 28a, which is positioned at a location lower than the intermediate portion 28b. Therefore, since the inner roller 48 has a low center of gravity, circumferential oscillations of the roller assembly 30 are prevented. As a result, frictional resistance is reduced, together with a reduction in thrust resistance.

In addition, with the constant-velocity joint 10 according to the present embodiment, the contact point between the inner roller 48 and the trunnion 28 takes place at the two locations of the first lobe 32 and the second lobe 36, or at the two locations of the third lobe 40 and the fourth lobe 44. Therefore, to the inner roller 48 and the trunnion 28, there are applied a force a vector of which is directed along the direction of torque transmission and a force a vector of which is directed along the direction of movement. Consequently, the vectors are composed, whereby a resultant vector is obtained.

As a result, a grip force acts between the roller assemblies 30 and the trunnions 28. More specifically, generation of slippage, or stated otherwise, the occurrence of slipping resistance, between the roller assemblies 30 and the trunnions 28 is prevented. This feature as well contributes to a reduction in sliding resistance and thrust resistance.

It is a matter of course that when the contact location is changed from the first lobe 32 and the second lobe 36 to the third lobe 40 and the fourth lobe 44, the same effects and advantages as discussed above are realized. In addition, from the fact that the contact locations undergo change in this manner, localized wear and abrasion of the trunnions 28 or the inner rollers 48 can be avoided.

The present invention is not limited to the above embodiment. Various changes and modifications may be made to the embodiment without departing from the scope of the invention as set forth in the appended claims.

For example, instead of the trunnions 28, cylindrically shaped trunnions with a substantial equal or constant diameter, or substantially spherically shaped trunnions may also be provided.

What is claimed is:

1. A constant-velocity joint interposed between a first transmission shaft and a second transmission shaft, the constant-velocity joint being configured to transmit rotary drive power from the first transmission shaft to the second transmission shaft, comprising:

an outer member coupled to the first transmission shaft, the outer member having a plurality of guide grooves defined in a side wall surface of the outer member, the guide grooves being spaced at prescribed intervals from each other and extending in an axial direction of the outer member;

an inner member having an annular member and a plurality of holders, which project from the annular member respectively into the guide grooves, the annular member having an insertion hole, the second transmission shaft being inserted through the insertion hole, the inner member being inserted into the outer member; and a plurality of roller assemblies mounted respectively on the holders, the roller assemblies being configured to rotate inside of the guide grooves;

wherein each of the roller assemblies includes an inner roller, and an outer roller mounted externally of the inner roller through rolling members, wherein when viewed from the axial direction, an inner wall surface of the inner roller contacts the holder only at a proximal end portion of the inner roller, wherein the inner roller is divided in a height direction from the axial direction into three equal parts made up of the proximal end portion, an intermediate portion, and a distal end portion, from a side proximate to the annual member toward a side distanced from the annular member, and wherein the inner wall surface of the inner roller contacts the holder only at the proximal end portion of the inner roller along a direction perpendicular to a longitudinal direction of the guide grooves.

2. The constant-velocity joint according to claim 1, wherein the inner wall surface of the inner roller contacts the holder at a middle location of the proximal end portion.

3. The constant-velocity joint according to claim 1, wherein an inside diameter of the inner roller gradually expands in diameter from a contact site with the side wall surface of the proximal end portion to a side that faces toward the distal end portion.

4. The constant-velocity joint according to claim 3, wherein the inside diameter of the inner roller gradually expands in diameter from the contact site with the side wall surface of the proximal end portion to a side that faces toward the annular member.

5. The constant-velocity joint according to claim 1, wherein on a side wall surface of each of the holders, a plurality of regions to be contacted and a plurality of regions not to be contacted are provided, the regions to be contacted are configured to abut against an inner circumferential wall of the inner roller, the regions not to be contacted being distanced from the inner circumferential wall of the inner roller, the regions to be contacted and the regions not to be contacted being arranged alternately.

6. The constant-velocity joint according to claim 5, wherein four of the regions to be contacted and four of the regions not to be contacted are provided, and tangential lines of two of the regions to be contacted are parallel with an axial direction of the guide groove, whereas tangential lines of remaining two of the regions to be contacted are perpendicular to the axial direction of the guide groove.

* * * * *